Figure 1:
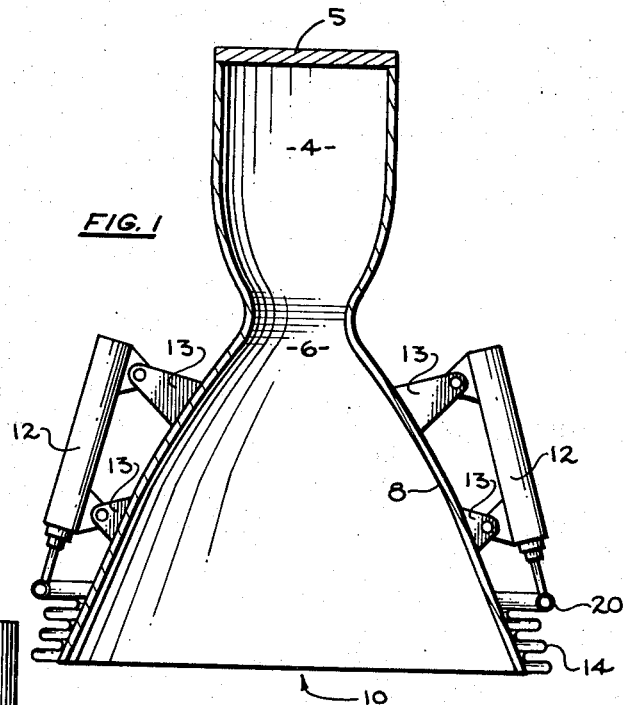

Oct. 10, 1967    D. L. FULTON ETAL    3,346,186
EXTENSIBLE ROCKET NOZZLE COMPRISED OF A COATED FLEXIBLE
MESH SUBSEQUENTLY DEPLOYED AND HEATED
TO BECOME IMPERMEABLE
Filed Oct. 5, 1964

INVENTORS
DONALD L. FULTON
RICHARD S. REEL
JAMES L. REEVE
JOHN A. STAHMANN
JOSEPH G. VEHIGE

BY

*Donald W. Draves*
ATTORNEY

United States Patent Office 3,346,186
Patented Oct. 10, 1967

3,346,186
EXTENSIBLE ROCKET NOZZLE COMPRISED OF A COATED FLEXIBLE MESH SUBSEQUENTLY DEPLOYED AND HEATED TO BECOME IMPERMEABLE
Donald L. Fulton, Canoga Park, Richard S. Reel, Tarzana, James L. Reeve, and John A. Stahmann, Van Nuys, and Joseph G. Vehige, Woodland Hills, Calif., assignors to North American Aviation, Inc.
Filed Oct. 5, 1964, Ser. No. 401,428
10 Claims. (Cl. 239—11)

This invention relates to a barrier for preventing the passage of fluids which is relatively flexible and relatively permeable prior to heating and when heated becomes relatively impermeable.

More particularly, this invention relates to a barrier for use as a nozzle extension on a rocket engine or the like.

In the art of rocket engines, there is an ever increasing need for some means to increase the expansion ratio on nozzles to compensate for varying ambient pressures. For example, at sea level, the expansion ratio for rocket engines should be less than at high altitudes where ambient pressure approaches zero. In the past, it has been necessary to make the expansion ratio of a rocket engine at a set figure. Thus, at higher pressures than at the design level or at lower pressures the engine is not as efficient as it would be if the expansion ratio varied according to altitude. Many approaches have been suggested to provide a variable expansion ratio by telescoping a nozzle extension from the engine as higher altitudes are reached, but these have proved generally unsuccessful. It is to obviate many of the problems in the prior art to which this invention is directed.

The invention in its more basic form comprises a thrust chamber having a rigid nozzle having an expansion ratio designed for use at sea level or similar pressures. As the engine is fired and the vehicle which is being propelled reaches a higher altitude, a flexible material is deployed aft of the nozzle. The material is a mesh or cloth which is impregnated with a substance which, when subjected to the heat of the engine, will melt and fill the interstices of the mesh or cloth to render the cloth substantially impermeable to gas.

An object of this invention is to provide a flexible barrier which when subjected to heat becomes substantially impermeable to the passage of gas.

Another object of this invention is to provide a method whereby a flexible mesh or cloth is rendered substantially impermeable to the passage of gas.

A particular object of this invention is to provide a nozzle extension which is initially flexible and when deployed and subjected to heat becomes relatively impermeable to the passage of gas and is able to transmit thrust to the engine.

Figure 2:
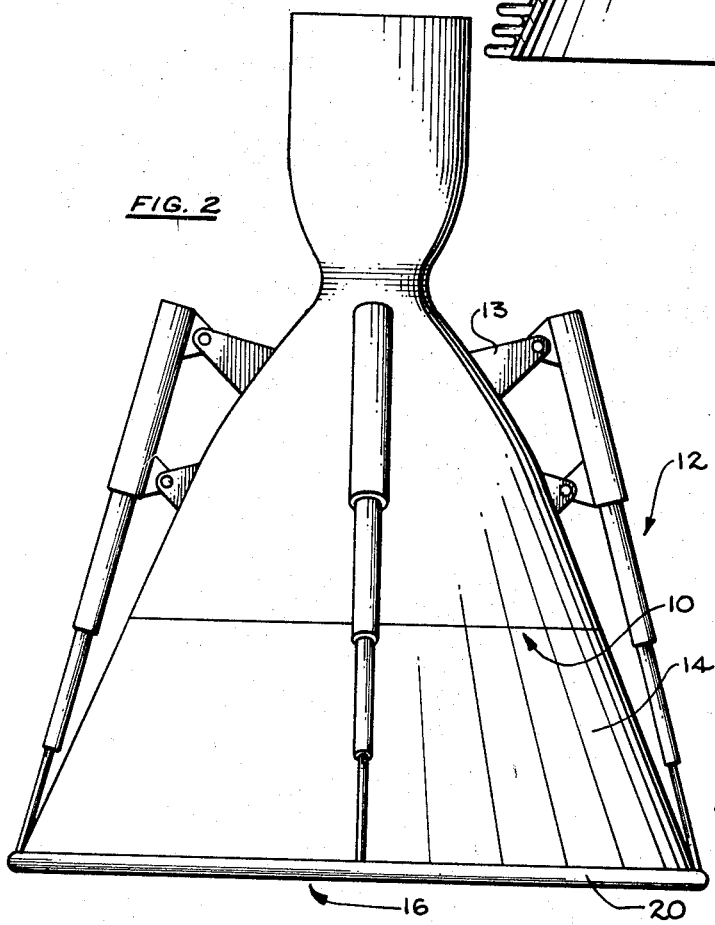

Other objects and advantages of this invention will become apparent as this description proceeds taken in conjunction with the accompanying drawings in which:

FIG. 1 is a schematic view partially in cross-section of a rocket engine with a nozzle extension in stored position, and FIG. 2 is a schematic view of a rocket engine with the nozzle extension in deployed position.

Referring now to FIG. 1, there is shown generally at 2 a conventional rocket engine employing the extendible nozzle of this invention. The engine includes a combustion chamber 4, an injector 5, a throat area 6 and a conventional nozzle wall 8. The expansion ratio of the engine is defined by the ratio of the exit area 10 to the throat area 6. For optimum efficiency, this expansion ratio should be smaller at sea level and larger at higher altitude due to the change in ambient pressure. In the instant invention, therefore, the extendible nozzle is not used at sea level but is deployed only when the ambient pressure falls to a pre-determined level. Telescopic tubes 12 which are attached to the nozzle walls by means of braces 13 are the means by which the extendible nozzle is placed in operating position shown in FIG. 2. The telescopic tubes 12 are internally pressurized by means not shown, but may comprise a pressurized container connected to the tubes to extend the nozzle. A ring or hoop 20 adapted to absorb hoop stresses is attached to the inner tube of tubes 12 and to one end of the flexible nozzle 14 which has its other end attached to nozzle wall 8.

As seen in FIG. 2, exit area 16 is larger than area 10 thus providing a larger expansion ratio.

As an example of a cloth or mesh which has flexibility is Refrasil cloth (C–100–28), a leached glass fiber cloth manufactured by H. I. Thompson Fiberglass Co. This is a commercially available material and is described in U.S. application Ser. No. 624,658, now Patent No. 2,901,227 assigned to H. I. Thompson Fiberglass Co. In use, as a nozzle extension material, this cloth is impregnated with a colloidal alumina gel. This is compounded from approximately 9 parts by weight of a white free flowing powder consisting of fibril clusters of boehmite (AlOOH). This has been treated with approximately 1 part of relatively pure acetic acid in such a manner that it will disperse readily in water to form a translucent stabilized sol. The water constitutes approximately 90 parts by weight. The resulting gel is screeded or wiped on the Refrasil cloth until the fabric becomes semi-transparent and air pockets have been essentially eliminated. Approximately 0.07 pound of the sol is used per square foot of the fabric leaving the total weight of the cloth and impregnant at approximately 0.0801 pound per square foot.

In operation, when it is desired to deploy the extendible nozzle such as when a pre-determined altitude has been reached, tubes 12 are pressurized internally to force them from the position shown in FIG. 1 to that shown in FIG. 2. Nozzle 14 will thus be deployed from the folded position of FIG. 1 to the extended position of FIG. 2. The engine, if not already firing, is then fired. The heat from the exhaust will then cause the acetic acid and water to distill off. The colloidal alumina, however, will become viscous at a temperature in the neighborhood of 1500° F. and will fill the interstices of the Refrasil cloth, thus rendering the extendible nozzle substantially impermeable to gas. The pressure of the exhaust gases will be then transmitted to the now impermeable mesh and thence to the ring 20 and tubes 12 to contribute thrust to the engine.

Although a specific example has been given, it is within the scope of this invention to utilize any mesh which will maintain its structural integrity when subjected to heat and any additive or coating which when heated will become viscous and fill the interstices of the mesh. For example, it is within the scope of the invention to include for the mesh material such ceramics as glass and graphite. In addition, the mesh may be constructed of metal or a synthetic organic fiber such as rayon, nylon or Dacron. The mesh may also be constructed of natural materials such as cotton, linen, wool, wood or paper.

Additives which may be used to flow into the interstices of the mesh or cloth are heat polymerizable resins, alloys, ceramics, plastics and metals.

Specific examples are as follows.
Refrasil—Colloidal Silica
Refrasil—Silica Organosol
Refrasil—Silica Organosol with glass frit added
Refrasil—Silicone rubber and glass frit
Refrasil—Colloidal Alumina
Mesh—Acrylic emulsion/enamel (on 80 x 80 and 200 x 200 mesh)

Mesh—Silicone rubber/lead silicate frit (on 200 x 200 mesh)

Mesh—Sodium silicate (on 200 x 200 mesh)

A satisfactory colloidal alumina is manufactured by E. I. du Pont de Nemours Inc., disclosed in U.S. Patent No. 2,915,475. Another additive is a colloidal silica such as disclosed in U.S. Patent Nos. 2,892,797 and 2,577,485 assigned to E. I. du Pont de Nemours Inc.

While telescoping tubes have been described as the means for deploying the nozzle, other devices can be used. These would include inflatable tubes such as a rubber fabric coated with an aluminized silicon to provide a reflective surface so that heat radiating from the engine will not cause damage to the fabric.

While the invention has been described with reference to a rocket engine, it is within the scope of this invention to use the barrier in other applications. As an example, the invention is ideally suited as an antenna in space where it can be deployed when desired. The additives can be melted by the application of any source of heat as by electricity passed through resistance wires embedded in or forming part of the mesh or cloth.

While various embodiments of this invention have been shown and described, it is to be understood that the invention is to be limited only by the scope of the claims appended hereto.

We claim:

1. A method of forming a nozzle extension on a rocket engine or the like comprising;
   providing a flexible mesh having a coating thereon in a position adjacent the outer periphery of the normal exhaust nozzle of the rocket engine in a deployed condition, said coating being adapted to melt when heated,
   deploying said flexible mesh and coating to a nozzle forming position, and
   heating said mesh and coating, whereby said coating will melt and fill the interstices of said mesh to render said mesh substantially impermeable to gas.

2. A method according to claim 1 in which said mesh and coating is heated by the exiting exhaust from said rocket engine when being fired.

3. The method of forming a relatively impermeable structure from an initially permeable foldable sheet material which comprises;
   providing a mesh structure having interstices therein and coated with a coating containing a substantially solid material,
   storing said mesh structure in a minimum volume in an undeployed condition,
   deploying said coated mesh structure so as to encompass a maximum volume,
   heating said mesh until said solid material becomes viscous,
   whereby said viscous material will flow and fill said interstices to render said mesh substantially impermeable.

4. The method according to claim 3 in which said mesh comprises a metallic screen.

5. The method according to claim 3 in which said mesh comprises a glass cloth.

6. The method according to claim 5 in which said solid material comprises a colloidal alumina.

7. The method to claim 5 in which said solid material comprises silica organosol.

8. The method according to claim 5 in which said carrier and solid material comprises an acetic acid stabilized sol of colloidal alumina.

9. In a gas generating device having a combustion chamber and a nozzle, that improvement which comprises;
   a flexible nozzle extension being adapted to extend from a stored position to an operating position aft of said nozzle, said extension being formed of a mesh having coated thereon a material adapted to melt when subjected to heat and to fill the interstices of said mesh whereby said extension will be substantially impermeable to gas.

10. A gas generator comprising,
   a rigid chamber connected at one end to fluid inlet means,
   a flexible nozzle fixed to the downstream end of the rigid chamber, said nozzle being constructed of mesh material coated with a meltable coating,
   means for storing the nozzle in a retracted position and means for extending the nozzle in a downstream direction to form an extension on the chamber, and means for heating the nozzle in its extended positions sufficient to cause the coating to melt and fill the interstices of the mesh material with a result that that the nozzle is made gas impermeable.

References Cited

UNITED STATES PATENTS

| 2,608,820 | 9/1952 | Berliner | 239—265.43 |
|---|---|---|---|
| 2,703,959 | 3/1955 | Wetherbee | 239—265.33 |
| 3,017,318 | 1/1962 | Labino et al. | |
| 3,017,746 | 1/1962 | Kiphart | |
| 3,047,442 | 7/1962 | Bozzacco | 161—193 X |
| 3,085,126 | 4/1963 | Labino | |
| 3,135,297 | 6/1964 | Nordberg et al. | |
| 3,249,306 | 5/1966 | Altseimer | 239—265.43 X |

FOREIGN PATENTS

| 796,291 | 6/1958 | Great Britain. |
|---|---|---|

M. HENSON WOOD, JR., *Primary Examiner.*

ROBERT B. REEVES, *Examiner.*

VAN C. WILKS, *Assistant Examiner.*